United States Patent [19]
Langley

[11] 3,850,159
[45] Nov. 26, 1974

[54] DEVICE FOR COLLECTING ANIMAL URINE

[75] Inventor: John Arthur Langley, Bury St. Edmunds, England

[73] Assignee: National Research Development Corporation, London, England

[22] Filed: July 17, 1973

[21] Appl. No.: 379,924

[30] Foreign Application Priority Data
July 20, 1972  Great Britain............... 34042/72

[52] U.S. Cl..................... 128/2 F, 119/95, 128/295
[51] Int. Cl............................................ A61b 10/00
[58] Field of Search......................... 128/294–295, 128/DIG. 24, 2; 119/95

[56] References Cited
UNITED STATES PATENTS

| 337,181 | 3/1886 | McDonough | 119/95 |
|---|---|---|---|
| 474,559 | 5/1892 | Kellogg | 119/95 |
| 2,173,356 | 9/1939 | Cross | 119/95 |
| 2,472,186 | 6/1949 | Arnold | 128/295 |
| 3,036,553 | 5/1962 | Gandier | 128/295 |
| 3,090,356 | 5/1963 | Andrisani | 119/95 |

Primary Examiner—Kyle L. Howell
Attorney, Agent, or Firm—Cushman, Darby & Cushman

[57] ABSTRACT

A device for collecting urine from a female horse comprises a receptacle having means for suspending it beneath a female horse, in which the receptacle has a rear guide portion so shaped as to extend in the region occupied by the vulva of the female horse. A device for collecting urine from a male horse comprises a receptacle having means for suspending it beneath a male horse in a position spaced from and free from contact with the penis of the horse, in which the receptacle has a front guide portion so shaped as to extend below and to the fore of the penis of the horse in the path of urine leaving the penis. The or each guide portion is adapted to guide into the receptacle urine striking the guide portion. Preferably the receptacle is so shaped as to extend in the regions occupied by the urinary organs of both the male and female.

4 Claims, 3 Drawing Figures

DEVICE FOR COLLECTING ANIMAL URINE

The present invention relates to a device for collecting animal urine and is concerned in particular but not exclusively with the collection of horse urine.

The collection of animal urine has three main purposes, namely the examination of the condition of the animal for veterinary or experimental purposes, the examination of the urine for dope testing before horse racing, and the collection of urine for certain hormones used in the perfumery industry.

Previous devices have been provided for collecting horse urine for the first purpose by means of a funnel-like collector fastened by a harness over the genitals of a male horse and having a pipe leading from the funnel-like collector to a separate receptacle not attached to the horse. In another arrangement a small plastic bag has been fastened by a harness in a position entirely enclosing the genitals of a male horse. Both arrangements cause considerable inconvenience to the horse. In the first instance the horse suffers from the restriction of the pipe, and in the second case the horse's genitals are likely to be in contact with the urine before the bag is emptied. Also in both cases the collecting device is in close contact with the horse's genitals and under-belly before urination, and thereby causes discomfort.

Furthermore it has not been possible to use these devices with female animals.

The disadvantages of these known devices are particularly acute when considering a collecting device for the second purpose outlined above, namely the testing of race horses for the presence of dope. Race horses are of a highly strung nature and are particularly susceptible to the discomfort of any close fitting or irritating device. Furthermore, in the case of devices having parts such as pipes which are re-used on different horses, an owner may allege that any trace of dope found did not originate from his horse but from a horse which had used the apparatus previously.

So far as the collection of urine for the perfumery business is concerned, the method commonly adopted previously has been to place a bucket in a suitable position and wait.

According to the present invention there is provided a device for collecting urine from a female horse comprising a receptacle adapted to collect horse urine and having means for suspending the receptacle beneath a female horse, in which the receptacle has a rear guide portion so shaped as to extend, when in position on a female horse, in the region occupied by the vulva of the horse, guide portion being adapted to guide into the receptacle urine striking the guide portion.

There is also provided in accordance with the invention a device for collecting urine from a male horse comprising a receptacle adapted to collect horse urine and having means for suspending the receptacle beneath a male horse in a position spaced from and free from contact with the penis of the horse, in which the receptacle has a front guide portion so shaped as to extend, when in position on a male horse, below and to the fore of the penis of the horse in the path of urine leaving the penis, the guide portion being adapted to guide into the receptacle urine striking the guide portion.

By the term horse is meant any member of the genus Equus or the family Equidae.

According to the present invention in another aspect there is provided a device for collecting animal urine comprising a receptacle adapted to collect animal urine and having means for suspending the receptacle beneath an animal, in which the receptacle is so shaped as to extend, when in position on the animal, in the regions occupied by the urinary organs of both the male and female of the species.

In accordance with yet another aspect of the invention, there is provided a device for collecting horse urine comprising a receptacle adapted to collect horse urine and having means for suspending the receptacle beneath a horse, in which the receptacle has a rear guide portion so shaped as to extend, when in position on a female horse, in the region occupied by the vulva of the horse, and in which the receptacle has a front guide portion so shaped as to extend, when in position on a male horse, below and to the fore of the penis of the horse in the path of urine leaving the penis, each guide portion being adapted to guide into the receptacle urine striking the guide portion.

It is preferred that the said receptacle is formed of flexible sheet material, for example flexible synthetic plastics material such as polythene or polyvinylchloride, and is a disposable unit, that is to say intended for use on one occasion only.

Preferably the rear guide portion comprises a first part extending from the channel portion and having a floor part and two upstanding side wall parts, and a second part consisting of a flat sheet of material extending from the said first part and being positioned in register with the vulva of the horse when the device is attached to a female horse.

Preferably the said front guide portion includes a floor part and two upstanding side wall parts, the floor being positioned in the path of urine leaving the penis when the device is attached to a male horse.

Preferably the said front guide portion includes a loop for, or is attached to, a strap adapted to pass around the chest portion of a horse.

Preferably the said rear guide portion includes a loop for, or is attached to, a pair of straps adapted to pass one on each side of the anus and tail of the horse and to lead to a harness portion passing along the back of the horse.

Preferably the device includes a bag portion fixedly secured to the channel portion and positioned to be suspended beneath the channel portion in use, the bag portion being in communication with the channel portion through an aperture therein, and being adapted to retain urine guided to the channel portion. Preferably the said aperture includes s flap positioned to act as a valve to allow urine to flow into the bag portion but to inhibit flow of the urine from the bag portion, for example if the animal lies down while the device is attached to the animal.

An embodiment of the invention will now be described by way of example with reference to the accompanying drawings in which.

Figure 1:
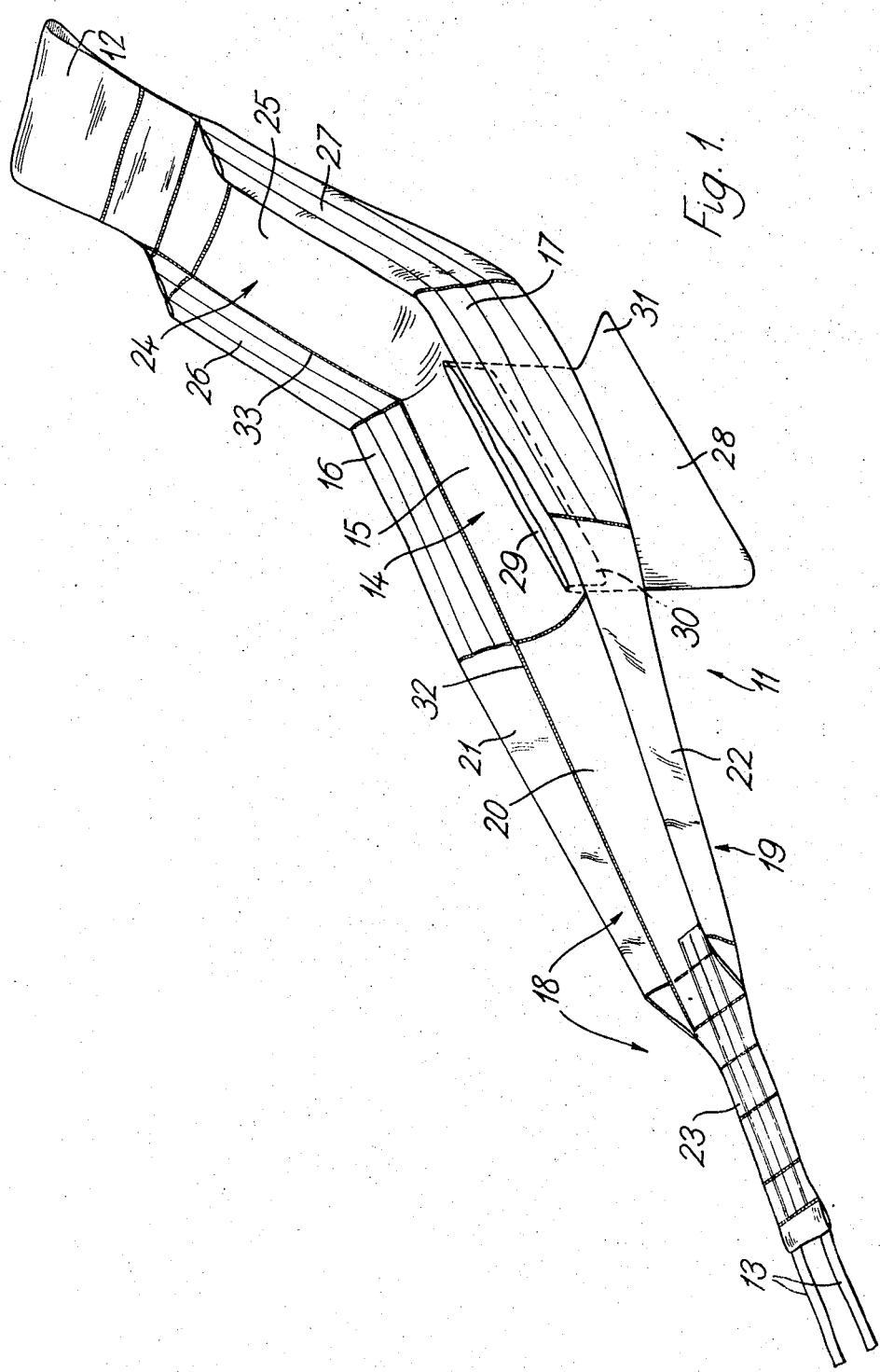
FIG. 1 is a perspective view of a device according to the present invention for collecting horse urine.

Referring to FIG. 1, a device according to the present invention for collecting horse urine comprises a flexible receptacle indicated generally at 11, and having means for suspending the receptacle beneath a horse comprising a loop 12 for engagement with a harness to be described hereinafter, and a pair of tapes 13 also for engagement with the harness. The receptacle 11 consists of a channel portion 14 having a floor 15 and upstanding side walls 16 and 17. Integral with the channel portion 14 at the end which in operation is positioned to the rear of the animal, is a rear guide portion 18 which extends rearwardly in two parts. The first part 19 consists of a floor part 20 and upstanding side wall parts 21 and 22, and the second part consists of an elongated sheet 23 of material comprising an extension of the floor part 20. The tapes 13 project in line with the second part 23.

At the other end of the channel portion 14 which in operation is positioned to the front of the animal, is a front guide portion 24 which consists of a floor part 25 and upstanding side wall parts 26 and 27. The loop 12 forms part of an extension of the floor part 25. The side walls 26 and 27 are integral with side walls 16 and 17, but are joined at an angle to each other such that the floor part 25 is constrained to be inclined to the floor 15 of the channel portion 14. The floor part 20 of the rear portion 18 is not constrained to be inclined to the floor 15 of the channel portion 14, but may be slightly inclined in operation due to positioning of the tapes 13 and the harness passing through the loop 12.

Secured to the floor 15 is a bag 28 having an upper opening in communication with an aperture 29 in the floor 15. The aperture 29 contains a flap 30 positioned to effect a valve function so that urine collected in the channel portion 14 can flow easily into the bag 28, but is hindered from returning out of the bag 28 by the flap 29. The flap 30 is integral with the floor 15 but is folded down to reside within the bag 28. The bag 28 has an elongated pouring portion 31 which is initially closed, but which, when opened by cutting off the end thereof, provides an outlet for urine collected.

Preferably the device is constructed entirely of flexible sheet material such as polythene or polyvinylchloride including the tapes 13. The various parts of the device may be joined integrally together by thermo welds indicated in various weld lines shown in the drawing, for example the weld lines 32 and 33 between the wall part 21 and floor part 20, and the wall part 26 and floor part 25, respectively. The sheet material may conveniently be of double or more thickness at positions of particular stress or wear, for example the portion 23 and the various side walls of the receptacle 11.

Figure 2:
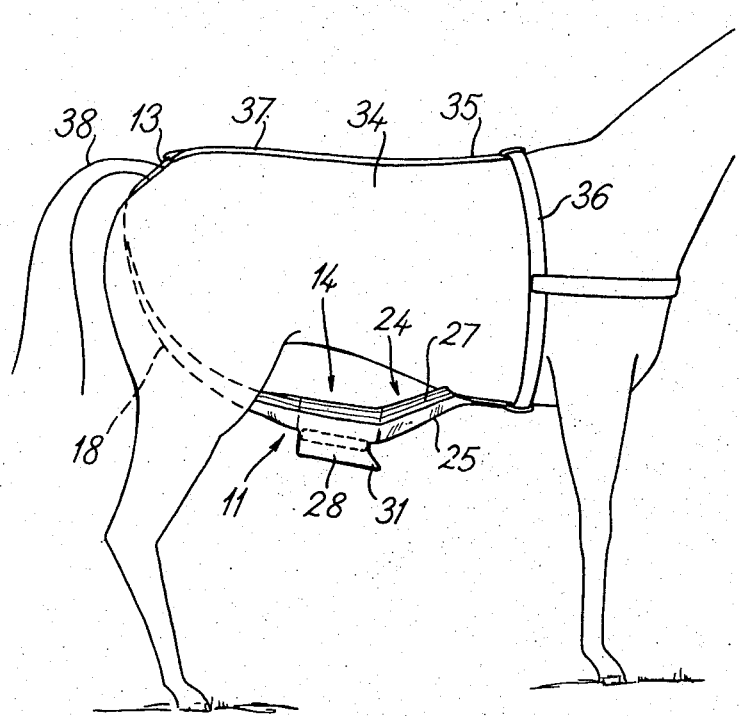
FIG. 2 is a side elevation of the device of FIG. 1 when in use suspended beneath a horse.
Figure 3:
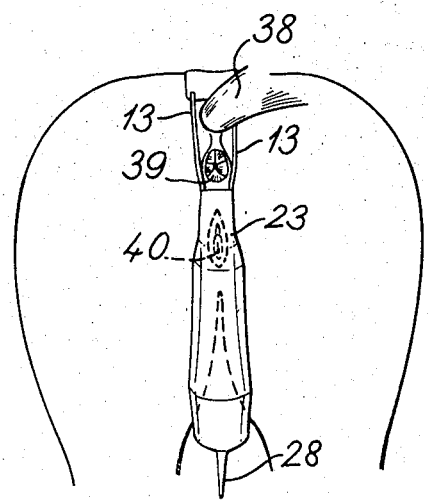
FIG. 3 is an end view of the device of FIGS. 1 and 2 when in use on a horse.

Referring now to FIGS. 2 and 3, the receptacle 11 is suspended beneath a horse 34 by a harness 35. A chest strap 36 of the harness 35 passes through the loop 12 which is positioned beneath the horse's chest, and a back strap 37 of the harness 35 passes to a position above the horse's tail 38 where it is secured to the tapes 13.

As shown in FIG. 3, the tapes 13 pass one on either side of the horse's tail 38 and anus 39. This is true for both male and female animals, and ensures that any bowel motions pass over the top of the extension 23 and do not enter the urine collection device.

The device is illustrated when suspended from a female horse, and it can be seen from FIG. 3 that the extension portion 23 rises to a position covering the vulva 40. During urination, the urine strikes the extension portion 23 and is directed down the rear portion 18 to the channel portion 14 where it passes into the bag 28. In the case of a male horse, the urine strikes the floor 25 of the front conduit portion 24 as shown in FIG. 2, and is again guided to the channel section 14 at the bag 28.

When it is desired to remove the urine, the tip of the pouring portion 31 is cut off and the urine flows into a suitable container. This may be carried out while the device is suspended beneath the animal.

As will be seen from the drawings, it is a great advantage of embodiments of the present invention that the receptacle 11 may be arranged to hang below the horse in a position clear of the belly of the horse. This is a most sensitive portion of a horse, so that the animal is particularly disturbed by any contact with its under belly. A further advantage of the present invention is that the arrangement allows the receptacle 11 to be formed out of a light flexible material, so that a light and simple harness can be used to suspend the receptacle.

By way of example only, the length of the device shown in FIG. 1 may be 50 inches from the end of the extension 23 to the loop 12 and the width of the channel portion 14 may be 6 inches between the side walls 16 and 17. The bag 28 may have a capacity of, for example, 1 litre.

I claim:
1. A device for collecting horse urine comprising:
a channel portion having a floor part and two upstanding side wall parts;
a receptacle suspended below said channel portion and communicating therewith by way of an aperture in the floor part of said channel portion;
a guide portion having a floor part and two upstanding side wall parts constituting an extension of said channel portion and a further portion in the form of a flat sheet of material extending from the floor part of said guide portion so as to be positioned to intercept the flow of urine from the horse when attached to a horse; and
means for attaching the device to a horse with the upstanding side wall parts of said channel portion being located beneath and clear of the belly of the horse.

2. A device according to claim 1, including a flap positioned at said aperture to act as a valve to allow urine to flow into the receptacle but to inhibit flow of the urine from the receptacle.

3. A device for collecting horse urine comprising:
a rear guide portion so shaped as to extend, when in position on a female horse, in the region occupied by the vulva of the horse in the path of urine leaving the vulva;
a front guide portion so shaped as to extend when in position on a male horse, below and to the fore of the penis of the horse in the path of urine leaving the penis;
a channel portion connected between said front guide portion and said rear guide portion beneath the belly of the horse; and
a receptacle suspended below an aperture in said channel portion and adapted to receive urine guided into said channel portion by said guide portions.

4. A device according to claim 3, in which said guide and channel portions each include a floor part and two upstanding wall parts, the walls and floor of said guide portions constituting extensions of the walls and floor of said channel portion.

* * * * *